UNITED STATES PATENT OFFICE.

HERMAN G. C. PAULSEN, OF FLATLANDS, NEW YORK.

IMPROVEMENT IN CLARIFYING AND REFINING SUGAR-JUICES, &c.

Specification forming part of Letters Patent No. 26,050, dated November 8, 1859.

*To all whom it may concern:*

Be it known that I, HERMAN G. C. PAULSEN, of the town of Flatlands, in the county of Kings and State of New York, have invented a new and Improved Mode of Making and Refining Sugars; and I do hereby declare that the following is a full and exact description thereof.

Crude sugar and the juices of all saccharine vegetables contain albumen and other nitrogenous substances, (the albuminoids,) and also pectates and other earthy salts, more or less. The albumen and albuminoids, being subject to the most rapid and easy decomposition, are the germs of the fermentation (vinous and acidulous) in the saccharine juices or solutions of sugar, and occupy the first rank among the causes of the deterioration of saccharine juices or solutions of sugar during manufacture, and of the transformation of crystallizable into uncrystallizable sugar. The pectates and other earthy salts are the causes of the susceptibility of the crude sugar to atmospheric changes, (deliquescence,) and are also the greatest obstacles to the crystallization of saccharine substances. All these combined and the long-continued application of heat are the causes of the impure flavor, color, undeveloped crystals, and molasses of crude sugar. To remove these the above-named impurities is the object and business of the refining process.

Alcohol possesses the following natural qualities or properties: First, it coagulates albumen, the albuminoids, and other nitrogenous substances; second, it coagulates pectic acid and the pectates at the temperature of its boiling under the pressure of the atmosphere; third, it has so great an affinity for water as to absorb the water of solution or crystallization of earthy salts when brought in contact, so as to reduce these salts to a fine amorphous powder; fourth, it does not dissolve sugar when cold, and dissolves only a small percentage at its boiling-point; fifth, it boils at a low degree of heat under the atmospheric pressure at 176° Fahrenheit, and under a vacuum of only two inches pressure at 90° Fahrenheit.

Now, the principle or nature of my invention consists in this: to make the first-named three qualities or properties of alcohol applicable to the making and refining of sugar; but to effect this requires the neutralizing and overcoming the fourth-named property of alcohol, which property would otherwise make the application of alcohol to the refining of sugar impossible, because to refine sugar requires its solution in some medium. Therefore, to be able to apply the above-named first three properties and to neutralize the fourth-named property, I combine alcohol with water in such proportions as will retain the above-named three properties in full force, and add to this combination such a degree of heat as will not only facilitate the action of the first-named three properties, but also keep the sugar, when dissolved in this combination, in solution. Meantime the process of separating from it the coagulated nitrogenous substances, coagulated pectates, and amorphorized salts (earthy) is going on. The sugar dissolved in this combination of alcohol, water, and heat, being a liquor with a strong base of alcohol, requires only to be exposed to a low degree of heat (as named above in the fifth property of alcohol) to effect all the purposes required, a temperature as low as 176° Fahrenheit being sufficient, at which temperature it is impossible to affect the integrity of the sugar. Therefore the manner in which this my invention is to be performed or applied consists simply in melting or dissolving, boiling, and treating at the boiling-point of said combination of alcohol with water, sugar, or the juices of saccharine substances, for the purpose and to the effect of obtaining in one operation and by means of this combination and at a low temperature a perfect mode of producing sugar in its most pure state, or a perfect refining process for the same.

To enable others skilled in the art of boiling and refining sugars to understand and use my invention, I will proceed to describe its application and operation.

Under the term "alcohol" I understand and mean the commercial alcohol of ninety-five per cent., (95 per cent.) All other combinations of alcohol and water in different proportions I maintain are no longer alcohol, but separate and distinct substances, having changed their character and properties by the act of combination, occupying different volumes, having different boiling-points, and evolving heat in the process of combination, showing by this evolution a chemical action, which action always creates new bodies endowed with new properties. The combination of alcohol and water in all its proportions will effect the results desired; but the combinations above eighty-five per cent. of alcohol are difficult to operate with, by reason of the large quantity of the solution to be operated on and the difficulty of keeping it at the temperature required to prevent crystallization, and all the combinations below fifteen per cent. of alcohol requiring too long a time for practical purposes. The combination of alcohol and water which I find to work best consists of (or very near it) sixty per cent. (60 per cent.) alcohol and forty per cent. (40 per cent.) water, the percentage by volume according to alcoholometry. The quantity of said combined liquids to be used is about fifty or sixty per cent. of the weight of the sugar.

The combination of alcohol and water and the application of this combination to sugar may be effected in three different ways: First, to the expressed juice of saccharine substances, be it from canes, roots, trees, or other vegetable products, so much pure alcohol of ninety-five per cent. is to be mixed as to combine with the water present in the juice sufficient to produce the combination of alcohol and water in such proportion as to produce the result required; second, raw sugar to be refined is melted or dissolved in a combination of alcohol and water previously combined in the required proportions; third, into sugars dissolved in water pure alcohol of ninety-five per cent. is mixed to the extent so as to form the combination of alcohol and water in the required proportions to effect the result desired.

Having melted and dissolved the sugar in a combination of alcohol and water by the application of heat, effected either by fire or steam, or having changed the juices of saccharine substances by combination of its water with alcohol equal to a solution of sugar in this combined liquid, I continue to heat up by fire or steam till the solution is boiling, which generally is the case at 176° Fahrenheit, continue boiling for about half an hour, stirring the solution while boiling, and then decant or draw off the solution into another vessel for the purpose of gradually and slowly cooling and settling. The combined liquid of alcohol and water, in getting heated up and finally boiling, dissolves the sugar, and thus while boiling first coagulates all the vegetable albumen and other nitrogenous substances present in the sugar solution or juices; secondly, absorbs the water of solution of the earthy salts and changes them to an amorphous fine powder, which, with the impurities mechanically mixed in the solution, are, thirdly, entangled in the coagulating albumen and carried in the slow settling of all the impurities together to the bottom of the vessel; fourthly, dissolves the gums, so as to permit the crystals of sugar to form or shoot without inclosing any of the gums. The solution having settled off, which is effected in eight or ten hours, is then drawn off from the sediments and boiled down to the crystallizing-point in any vessel or apparatus which the operator may choose, taking care, of course, to recover the combined liquor to be used in further and other operations. The sugar solution having been boiled down to the crystallizing point is crystallized and finished in the usual mode of sugar refiners or planters.

I do not claim the application of alcohol by itself to any treatment of sugar or juices of saccharine substances without reference to its proportion to the water present in such juices, and without addition of heat, as others have done.

What I claim as my invention, and desire to secure by Letters Patent, is—

The application of alcohol, in combination with water, in all the proportions as stated, and at the temperature of boiling of said combined liquids, to the melting or dissolving, boiling, or treating raw sugars or juices of saccharine substances, as herein described, for the purpose and to the effect of producing the intended making and refining of said sugars.

New York, October, 29, 1858.

HERMAN G. C. PAULSEN.

Witnesses:
  K. N. FRYATT,
  THEODORE PAYNE.